Jan. 29, 1957  R. T. DUNGAN  2,779,158
CONTROL FOR NON-HYPERGOLIC LIQUID PROPELLANT ROCKET ENGINES
Filed June 26, 1951  3 Sheets-Sheet 3

Fig 3

INVENTOR.
RICHARD T. DUNGAN
BY
ATTORNEYS

United States Patent Office 2,779,158
Patented Jan. 29, 1957

2,779,158

CONTROL FOR NON-HYPERGOLIC LIQUID PROPELLANT ROCKET ENGINES

Richard Thomas Dungan, Clayton, Ohio

Application June 26, 1951, Serial No. 233,673

10 Claims. (Cl. 60—35.6)

(Granted under Title 35, U. S. Code (1952), sec. 266)

The invention described herein may be manufactured and used by or for the Government for governmental purposes without payment to me of any royalty thereon.

This invention relates to control devices and more particularly to a control device or system for non-hypergolic liquid propellant engines and has for an object the provision of means for accurately controlling the starting, running, and shut-down functions of non-hypergolic liquid propellant rocket engines.

Another object is the provision of control means for a rocket engine which is self-sequencing and fail safe to the most practical degree.

In the present invention means are provided to utilize the oxidizer injector pressure to control the fuel injector pressure and to also use the fuel injector pressure to control the oxidizer injector pressure providing automatic control means for effecting a critical balancing ratio control between the quantity of fuel and oxidizer injected into the combustion or thrust chamber at all times, providing also an improved arrangement for initiating a liquid fuel rocket engine into operation with a simplified, substantially automatic control system.

In the present invention an ignition chamber is used to fire the fuel in a main combustion chamber into which the fuel and oxidizer are introduced in proper predetermined quantities to produce a predetermined properly proportioned explosive mixture, electrically operated ignition means being provided in the ignition chamber for firing the fuel and oxidizer supplied to the ignition chamber, including an energizing circuit and electro mechanical means for simultaneously supplying the fuel and oxidizer to the ignition chamber and simultaneously energizing the ignitor means to fire the mixture introduced into the ignition chamber.

The invention also utilizes the fuel and oxidizer combustion pressures in the ignition chamber to open the main fuel and oxidizer valve means for admitting the fuel and oxidizer components to the main combustion or thrust chamber in a proper predetermined ratio and provides means for causing an automatic shut down when the relative proportion of either of the fuel or oxidizer components vary beyond a predetermined degree, or in the event that the main combustion chamber pressure falls below a predetermined minimum.

A further object is the provision of a simplified substantially automatic control mechanism which will shut down the engine to indicate a malfunction in the case of a drop of the thrust chamber pressure due to any cause, during the operation of the engine.

A further object is the provision of a simplified control mechanism which may be easily applied to fixed or variable thrust liquid rocket engines with little change or modification of the engine structure.

A further object is the provision of a liquid fuel and oxidizer rocket engine control mechanism which provides a satisfactory and efficient substantially automatic control, at sea level and at all altitudes, during starting, running and shut down conditions at all times.

Other objects and advantages of the invention will become apparent from the following description, taken in connection with the accompanying drawings in which like reference characters refer to like parts in the several figures.

Drawings

Figure 1:
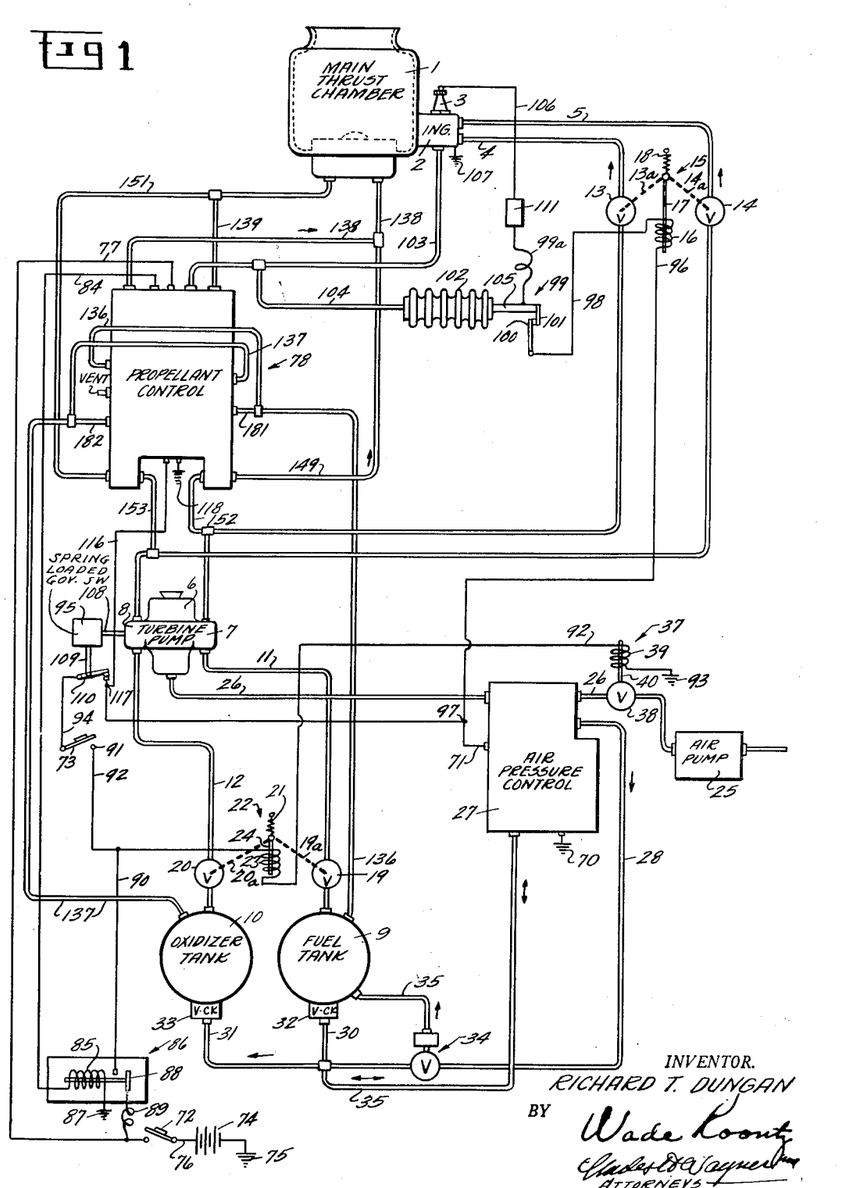
Fig. 1 is a plan view, illustrating diagrammatically a non-hypergolic liquid propellant rocket engine having my improved and simplified control mechanism applied thereto.

In the arrangement shown in Fig. 1 the reference numeral 1 denotes a liquid fuel rocket thrust chamber having an ignition chamber 2 at one side thereof, in which is located an electrical ignition device 3 such as a conventional igniter plug, hot wire plug, or any other electrical device for firing the liquid fuel and oxidizer mixture introduced into the ignition chamber 1 through the fuel and oxidizer delivery pipes, indicated respectively at 4 and 5.

The fuel and oxidizer propellant liquids are supplied under pressure through the fuel and oxidizer delivery conduits 4 and 5 from an air driven turbine pump 6 having fuel and oxidizer pump elements 7 and 8. The pump elements 7 and 8 are supplied from the main fuel and oxidizer supply tanks 9 and 10 through the fuel and oxidizer supply conduits 12 and 11.

The propellant delivery conduits 4 and 5 to the ignition chamber 2 each have one of the ignition control valves 13 and 14 therein which are connected to operating means or arms 13a and 14a for simultaneous actuation by a common solenoid or magnetic actuator 15 comprising an exciting magnet or solenoid coil 16 and armature or core 17 connected to the ends of the arms. The two ignition valves 13 and 14 are normally closed, and held yieldably closed, or moved to closed position by a spring device 18, and moved to open position simultaneously by the solenoid device 15 to admit the fuel and oxidizer liquids to the ignition chamber 2, the ignition control valves 13 and 14 being located between the delivery sides of the pump elements 7 and 8 and the igniter chamber 2.

Located in the supply conduits 11 and 12, between the fuel and oxidizer tanks 9 and 10 and the intake sides of the fuel and oxidizer pump elements 7 and 8 are two propellant control valves 19 and 20, also resiliently tensioned to closed position normally by a spring device 21 which is connected to the operating arms 19a and 20a of the valves 19 and 20 at their ends. The actuating arms 19a and 20a for the valves 19 and 20 are connected to a common actuator device 22, similar to the solenoid actuator 15 for opening the ignition valves 13 and 14, and comprise a solenoid coil 23, and an actuating armature 24 connected to the valve actuating arms 19a and 20a.

The main fuel and oxidizer tanks 9 and 10 are pressurized with air from an air pressure source such as a power driven air pump device 25 which delivers air under pressure through the air supply conduit 26 to the air pressure control device or box 27, described later in detail.

Figure 2:
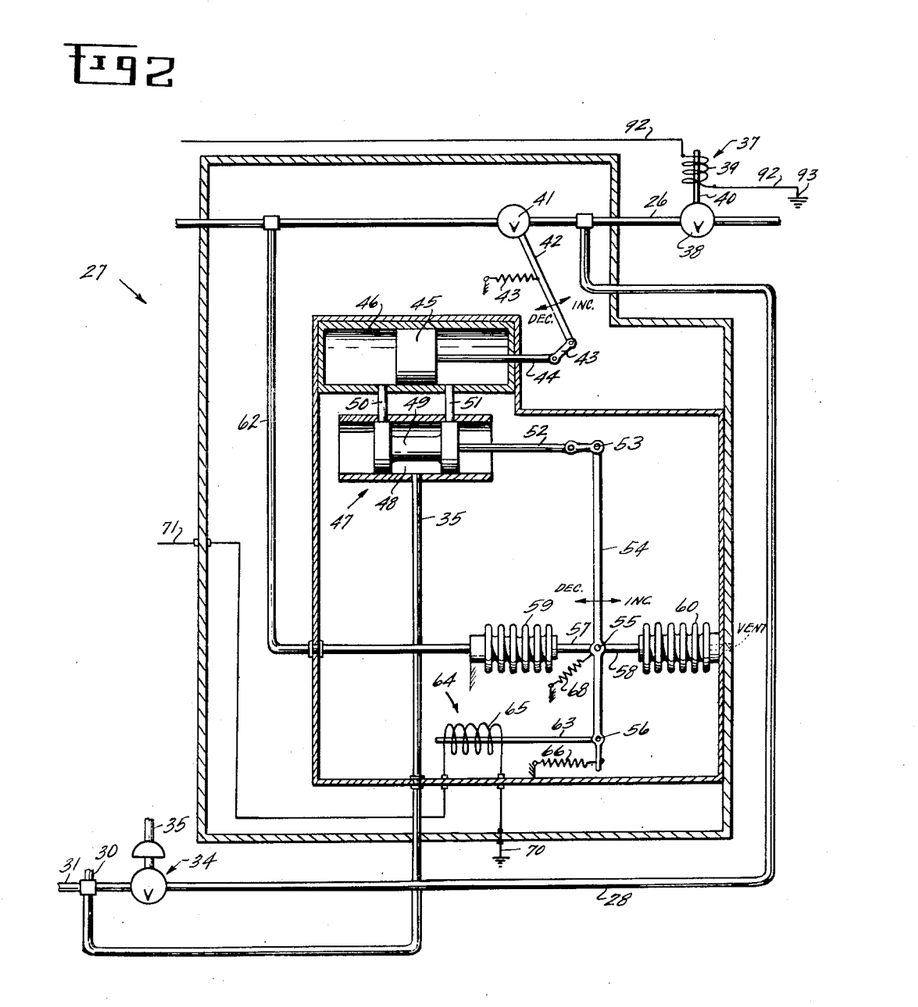
Fig. 2 is sectional view taken through the "air-pressure control box," containing important controlling components of my improved control mechanism, as shown in elevation in Fig. 1.

Referring momentarily to Fig. 2 the air supply conduit 26 passes through the top of the air pressure control box 27 and is connected to the air driven turbine 6. When air under pressure is delivered to the air turbine 6 through the conduit 26, it drives the turbine to operate the fuel and oxidizer pump device 7 and 8, fuel and oxidizer components being supplied to the inlet openings of the pump elements 7 and 8 when the propellant control valves 19 and 20 are opened.

The two main propellant tanks 9 and 10 Fig. 1 are pressurized through the air supply conduit 28, connected to the air supply line 26 within the air pressure control box 27, (Fig. 2) branch passages 30 and 31 extending therefrom, each having one of the check valves 32 and 33 therein, connected to admit air into the tanks 9 and 10. A pressure regulator device 34 is interposed in the conduit 28 having an air pressure control with a conduit 35 being connected between the control for the regulator 34 and the interior of the fuel tank 9 controls the operation of the regulator 34 to control the amount of air pressure supplied to the tanks 9 and 10 in a predetermined ratio to the internal pressure in the fuel tank 9. A branch air supply conduit 35 connects the pressurized air supply conduit 28 (30 and 31) with the air control mechanism, later to be described, contained within the air pressure control box 27.

A magnetically operable air control valve means 37 is positioned in the air conduit 26 and comprises a valve element 38, normally resiliently biased to a closed position by any suitable means such as a spring, and a solenoid actuator for opening the valve includes a magnet coil 39 and an actuating armature or core 40 connected to the valve 38. When the solenoid 39 is energized the valve 38 is opened, admitting air under pressure through conduit 26 from the pressure source 25 into the air pressure control box 27, also admitting air under pressure through the conduits 26, 28, 30 and 31 to pressurize the propellant tanks 9 and 10.

Air that is supplied to the turbine 6 is controlled by the valve 38 and is also controlled by another or throttle valve 41 located in the conduit 26, inside of the air pressure control box 27 between the solenoid air valve 38 and the air turbine 6, (see Figs. 1 and 2). This is a mechanical regulator or throttle valve having an actuating arm 42 normally biased toward a closed position by a light tension spring 43. The extremity of the actuating arm 42 is connected by any suitable means, such as a short link 43, to a piston rod 44 of an actuator piston 45 fixed thereon, located within the closed cylinder 46. The valve 41 is shiftable between a closed position when the piston 45 is at the left hand end of the cylinder and a fully open position when the piston 45 at the right hand end of the cylinder 46. A pilot actuator or servomotor valve is provided at 47 comprising an open ended cylinder 48 in which the balanced piston control valve 49 is slidably mounted. Spaced air delivery conduits 50 and 51 connect the larger power cylinder, as shown in Fig. 2, with the end portions of the smaller cylinder 48, the conduits 50 and 51 being normally covered by the spaced piston members of the pilot control valve 49. Movement of the pilot valve 49 in either direction from its central position vents one or the other of the conduits 50 or 51 to atmosphere and connects the other conduit with the space between two pistons of the valve 49. The air pressure supply pipe 35 (Fig. 1) connects the pilot valve cylinder 49 (see Fig. 2) at its center, supplying air to the power cylinder 46 at one side or the other of the piston 45 to shift the control valve 41 toward open or closed position. The pilot valve 49 is mounted on a piston rod 52, the outer end of which is suitably linked at 53 the upper extremity of a floating lever 54, having a shiftable central fulcrum point 55 and a shiftable lower end fulcrum point 56.

The central fulcrum 55 of the lever 54 is connected by actuating connections or links 57 and 58 respectively to adjacent ends of two spaced bellows or diaphragm devices 59 and 60. The bellows 60 has a small vent therein to atmosphere while the other bellows 59 is in communication with the air pressure supply line 26 through the conduit 62. Air conduit 62, is connected as shown in Fig. 2 at one end with the interior of the bellows 59, and at the other end with the air supply conduit 26 between the throttle control valve 41 and the turbine 6. The lower fulcrum 56 is suitably connected or linked to the end of an actuating armature 63 of a solenoid magnet device 64 having an exciting coil or core 65. The floating lever 54 is preferably connected adjacent its lower end fulcrum 56 a light opposing spring member 66 to yieldably stabilize the lower end of the lever in its left-hand position as shown in Figure 2 when the control mechanism in the air pressure control box 27 is shut down or at rest. When the solenoid coil 64 is energized the lower end 56 of the floating lever 54 is drawn to the right, rocking the lever counter-clockwise about the pivot 55. This moves servo piston 49 to the left and admits air through the conduit 35 to the left hand end of the power cylinder 46 maintaining the valve 41 tensioned counterclockwise in partially opened position at this time.

The flexible bellows 59 and 60 will probably be sufficiently resilient to initially stabilize the position of the intermediate fulcrum 55, although an opposing light spring 68 may be connected to the lever 54, close to the pivot 55 for this purpose. One terminal of the solenoid coil 65 is grounded at 70 and the other terminal is connected by the conductor 71 to a "Fire Circuit," later to be described.

Figure 3:
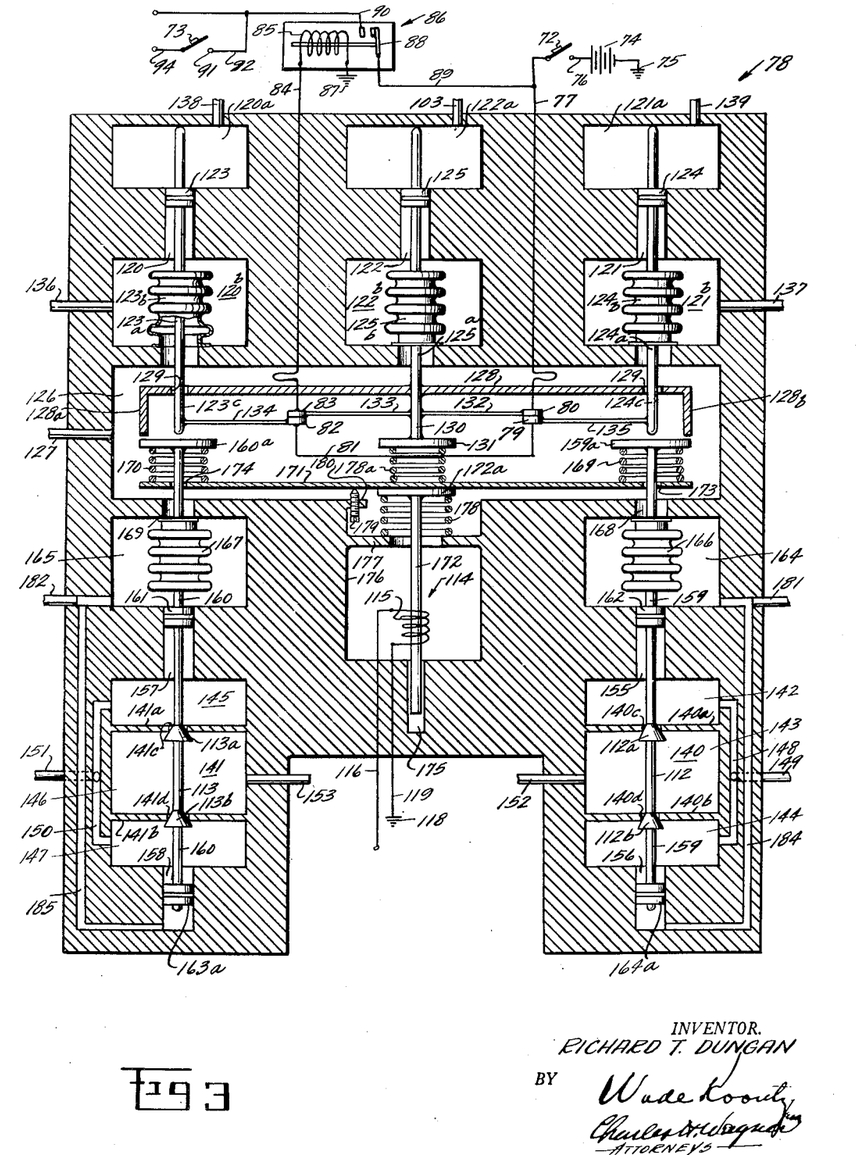
Fig. 3 is a sectional view through the "propellant control box," containing another important component of the mechanism and shown in elevation in Fig. 1.

The improved control apparatus incorporated an "Arm" circuit Fig. 1 which is closed by an arming switch or key 72, the "Fire Circuit" being closed by the firing switch or key 73. When the arming switch 72 is closed current is supplied from a suitable source, such as a battery 74 grounded at 75, and connected by conductor 76 to the "Arm" switch 72. The other terminal of the switch 72 is conducted through conductor 77 to separate contact terminals located within the propellant control box 78, shown in Fig. 3 in detail, and indicated at 79 and 80. After passing the cooperating contacts 79, 80, a connecting wire 81, cooperating contact terminals 82, 83, the circuit includes a conductor 84 connected to the terminal 83 which extends out of the propellant control box 78 and is connected to one terminal the exciting coil 85 of a normally open arm circuit relay 86, the other end of the relay coil 85 being grounded at 87. The contacts 79, 80, and 82, 83, within the propellant control box 78 are normally closed as shown in Fig. 3, both when the rocket engine is shut down, and when it is operating properly.

Closing of the arming circuit key 72, under these conditions energizes the relay 86 to draw the normally open switch contact armature 88, connected to conductor 77 by the conductor 89, to circuit closing position. Current now flows from battery 74 through the relay 86 and conductor 90, connected to the firing control switch terminal 91 by conductor 92. The propellant valve control solenoid coil 22, and solenoid coil 39 for the air source control valve are both connected in the conductor 92 and are now energized, the conductor 92 being grounded at 93 completes the circuit through ground to the battery 74.

It should be recalled that the air control valve 41 within the air pressure control box 27 (Fig. 2) is now partially opened, as before described, so that air under increased or full pressure from air pump 25 can not reach the turbine 6 until the air valve 41 in the control box 27 is opened more fully, although air is now flowing through the conduits 28, 31 to pressurize the fuel and oxidizer liquids in the tanks 9 and 10, air being also admitted through conduit 35 to the pilot control valve 47.

When the "Firing" switch 73 is closed (Fig. 1) current is fed through the conductor 92 (from conductor 90), through the firing switch 73, and conductor 94 to overspeed control switch means 95 which is normally closed, then through the conductor 96 which is connected to one terminal of the ignition valve solenoid coil 16. The conductor 71 for the solenoid 65 extending partly within the air pressure control box 27 (Fig. 2) is also connected at 97 to the conductor 96. The ignition valve 15 is energized, opening the ignition control valves 13 and 14 to admit the fuel and oxidizer through delivery pipes 4 and 5 into the ignitor chamber 2. The other terminal of the igniter valve solenoid coil 16 is connected by the conductor 98 to an electrical pressure control switch device 99. The switch 99 is normally closed and comprises a fixed contact 100 and a movable contact 101 which is connected to a pressure operated actuator or bellows 102, which is in turn connected to an ignition chamber pressure supply conduit 103 by a by-pass conduit 104. The ignition chamber pressure supply conduit 103 is in communication at one end with the interior of the ignition chamber 2, and its other end enters the top of the propellant control box 78 as seen in Figure 3. The ignition chamber pressure actuated switch 99 (Fig. 1) is normally closed, the contact terminal 100 being in contact with the movable contact 101 which is carried by but electrically insulated from the stem connection 105 to the ignition chamber actuated bellows 102. A "pig tail" 99a connects the movable contact 101 to one terminal of the igniter plug 3, through the conductor 106. The other terminal of the plug 3 is grounded on the ignition chamber and through the frame is indicated at 107, completing the circuit back to the battery through "ground."

The overspeed control device is driven by the shaft of the air driven turbine 6 and is indicated generally at 108, and comprises a governor, preferably a centrifugal type, which is spring loaded to keep the switch blade lifting rod 109 depressed normally, and during normal running speeds of the turbine when the turbine pump speed exceeds a predetermined set value the governor lifts the switch rod 109 connected to the overspeed switch contact blade 110 and opens the fire circuit causing a "shut down" of the engine. The igniter plug 3 may be a hot wire type or jump spark, and an intensifier device or coil 111 may be introduced in the conductor 106 for obtaining hotter ignition, if desired.

The propellant control box (Fig. 3) contains liquid fuel and oxidizer main control valves 112 and 113 explained below. A solenoid actuator device is carried within the propellant control box 78, indicated generally at 114, having a solenoid coil 115 for controlling the opening of two normally closed main propellant control valves 112 and 113. One end of the solenoid coil 115 is connected by a conductor 116 to the conductor 96 at 117 (Fig. 1) while the other terminal of the coil 115 is connected to ground at 118 by conductor 119.

Propellant control box

The propellant control box or casing 78, as shown in Fig. 3 comprises three cylinders 120, 121, and 122 in the upper portion. Enlarged pressure chambers 120a, and 120b, 121a and 121b, and 122a and 122b are formed in the casing above and below the cylinders, these chambers being in communication respectively with the upper and lower ends of the fuel, oxidizer and igniter chamber pressure cylinders 120, 121 and 122 respectively. Piston members 123, 124 and 125 are fixed to the actuator rods 123a, 124a and 125a and travel in the fuel, oxidizer and ignitor chamber pressure cylinders 120, 121 and 122 respectively. The lower ends of the enlarged chambers 120b, 121b and 122b open into an elongated common chamber 126 having a discharge or "overboard" vent passage 127 in communication therewith. Each of the piston rods 123a, 124a and 125a passes through the bottom of a sealing bellows member 123b, 124b and 125b, connected to the rims of the lower openings of the lower chambers 120b, 121b, and 122b, sealing the elongated chamber 126 off from the cylinders 120, 121 and 122, but permitting axial movement of the piston rods 123a, 124a and 125a, the upward movement of the piston rods being limited by engagement of their upper ends with the tops of the respective enlarged upper chambers 120a, 121a and 122a.

The central piston rod 125a has projecting therefrom at its opposite sides a pair of elongated rigid member or arms 128, extending laterally beyond the piston rods 123a and 124a and terminating in downwardly extending actuator end portions 128a and 128b, ending in about the same plane as the lower ends of the piston rods 123a and 124a, the actuator arms 128 being apertured at 129 to slidably accommodate the ends of the two piston rods 123a and 124a. The central piston rod 125a projects downwardly below other two piston rods 123c and 124c as indicated at 130 and terminating in a disk shaped spring seat 131. Electrical contact supporting arms or resilient blades 132 and 133 project laterally from the lower portion 130 of rod 125a and carry at their respective ends the insulated electrical contacts 80 and 83 to which the conductors 77 and 84, previously referred to, are suitably connected. The projecting portions 123c and 124c of the rods 123a and 124a extend downwardly below the elongated apertured arms 128 fixed on the rod 125a and have fixed thereon resilient contact arms or blades 134 and 135 on which the respective contacts 82 and 79 previously referred to are secured. The contacts 82 and 79 are connected together by a flexible electrical conductor 81 as before pointed out, and should be insulated from the supporting blades 134 and 135.

The enlarged pressure chamber 120b is connected to the fuel tank 9 by a conduit 136. The enlarged chamber 121b is connected to the oxidizer tank 10 by a conduit 137. The upper enlarged pressure chambers 120a, and 121a are respectively connected by conduits 138, 139 (Fig. 1) to the fuel and oxidizer injection nozzles in the thrust chamber. The upper central enlarged pressure chamber 122a is connected by conduit 103 (previously referred to) to the interior of the igniter chamber 2.

Located at opposite sides of the propellant control box 78, in the lower portion thereof, as seen in Fig. 3, are the main fuel and propellant delivery control valves 112 and 113, before referred to. These valves are balanced and preferably respectively in axial alignment with the respective piston rods 124a and 123a, the fuel and oxidizer valve chambers being indicated respectively at 140 and 141 and are formed with vertically spaced walls or partitioning 140a and 140b and have valve seats 140c, 140d, and partitions 141a and 141b having seats, 141c and 141d of the same diameter to receive and seat the balanced fuel and oxidizer main control valves 112a, 112b, and 113a, 113b, respectively mounted on the valve rods 112 and 113. The partitions 140a and 140b divide the valve chambers 140 into three compartments 142, 143 and 144 while the partitions 141a and 141b divide the valve chamber 141 into three sections 145, 146 and 147.

The end chambers 142 and 144 are connected together by a communicating conduit 148 which is in turn connected by a conduit 149 (Figure 3) to the conduit 138 (Figure 1) for delivering fuel to the thrust chamber 1. The end chambers 145 and 147 (Figure 3), are also connected by a communicating conduit 150, which in turn is connected by a conduit 151 to the oxidizer delivery conduit 139 (Figure 1) to the thrust chamber 1.

When the main propellant valves 112 and 113 of Figure 3 are opened liquid fuel and oxidizer components are admitted to the main thrust chamber 1 (Figure 1), fuel and oxidizer components being delivered respectively from the tanks 9 and 10 directly through the fuel and oxidizer pump elements 7 and 8 to the conduits 152 and 153 joining the fuel and oxidizer delivery conduits 4 and 5, previously mentioned.

Both ends of the main valve chambers 140 and 141 having reduced concentric cylinder portions 155, 156, and 157, 158 extending in opposite directions therefrom. The fuel and oxidizer valve stems 159 and 160 extend into the cylindrical portions and have piston members fixed thereon operable in the cylinder portions. The upper portion of the oxidizer valve rod 160 carries the piston 161 fixed thereon operating in the cylinders 157, while the upper end of the fuel valve rod 159 carries the piston 162 fixed thereon operating in the cylinder 155. "Balancing" pistons 163a and 164a are fixed on the valve rods 160 and 159 and operate in the lower cylinders 158 and 156, the lower ends of cylinders 158 and 156 being closed.

The upper ends of the fuel and oxidizer valve cylinders 155 and 157 open upwardly into enlarged cylindrical chambers 164 and 165 respectively, these chambers 164 and 165 have restricted openings in communication with the central elongated chamber 126. Bellows members 166 and 167 are sealingly fixed at their closed ends to the fuel and oxidizer valve stems 159 and 160, their open ends being secured around the periphery of the restricted ports 168, 169 of the chambers 164 and 165, similar to the bellows diaphragms 124b and 123b, hermetically sealing the fuel and oxidizer main valve chambers off from the elongated chamber 126.

The fuel and oxidizer valve rods 159 and 160 extend upwardly beyond the bellows members 166 and 167 to points just below the lower ends of the upper valve actuator rods 124a and 123a and terminate in disk shaped heads 159a and 160a, the heads 159a and 160a also extending laterally under the downwardly projecting end portions 128a and 128b of the arms 128. The heads 159a and 160a also serve as spring seats for the valve closing springs 169 and 170. The other ends of the springs 169 and 170 rest on an elongated speed control plate 171 that is carried by the armature rod 172 movable by the solenoid coil 115 of the solenoid 114 before mentioned, and form a suitably journalled guide stem for the elongated control plate 171. The plate 171 is apertured at 173 and 174 to slidably receive the main control valve stems 159 and 160 therethrough. The armature rod 172 is slidably received in a guide socket 175 in the bottom of the enlarged central recess 176, the walls of the recess 176 having a spring seat or flange 177 projecting therefrom. A compression coil return spring 178 is seated on the flange 177, its upper end being seated against the disk 172a at the upper end of the rod 172. An adjustable stop member 179 is threaded in an ear 180 projecting from the wall of the central recess 176 for limiting the downward movement of the control plate 171. A coil spring 178a is interposed between the upper surface of the elongated plate 171 and the disk 131, similar to the springs 169 and 170, urging the piston rod 125a and arms 128 upwardly and the plate 171 downwardly.

The enlarged chambers 164 and 165, below the movable spring seating plate 171, are respectively provided with propellant tank pressure supply conduits or pipes 181, 182 leading therefrom. Referring momentarily to Fig. 1 the conduit 182 is connected to the liquid oxidizer supply conduit 137, and is therefore in communication with the oxidizer tank (pressure) and also in communication with the actuating (fuel) cylinder 121 (Fig. 3) through the enlarged chamber 121b.

The liquid oxidizer tank pressure effective on the bottom of the piston 124 through pipes 137 and in chamber 121b tends to move the piston 124 upwardly while the oxidizer delivery pressure, when the main oxidizer valve 113 is opened, becomes effective on the top of piston 124 in the upper oxidizer chamber 121a (Fig. 3) through the conduits 139, 151 to move the piston 124 downwardly. Referring again to Fig. 3 the conduit 182 is connected to the conduit 137 (Fig. 1) from the liquid oxidizer tank 10. Fuel tank pressure is effective through conduit 136 from fuel tank 9 in enlarged pressure chamber 120b, Fig. 3, tending to lift piston 123, and fuel delivery pressure through conduits 149 and 138, Fig. 1, previously mentioned is also effective in upper chamber 120a, Fig. 1, against the opposite face of the piston 123 tending to move the piston 123 downwardly.

The chamber 165, Fig. 3, is in communication with the lower end of the cylinder 158 of the main oxidizer valve 113 through a communicating passage or conduit 185, to equalize the oxidizer tank pressure on the upper and lower faces respectively of the two pistons 161 and 163.

A similar communicating passage 184, Fig. 3, connects the enlarged chamber 164 that is connected by conduit 181 to the fuel tank 9, to the lower end of the lower fuel valve piston chamber 156, thus balancing the fuel tank pressure on the upper face of the piston 162 and on the lower face of the lower piston member 164a.

*Operation*

Assuming that it is desired to initiate the rocket engine into operation, the operator first closes the arming switch or key 72, Fig. 1. Current from battery 74 flows through conductor 77, contacts 79 and 80, (Fig. 3), conductor 81, contacts 82, 83, conductor 84 to energize the relay coil 85 (Fig 1), and back to the battery 74. The relay armature 88 closes to energize conductor 90, energizing propellant valve control solenoid actuator 22, opening the fuel and oxidizer propellant valves 19 and 20 to admit the fuel and oxidizer components to the intake sides respectively of the fuel and oxidizer pump elements 7 and 8 (Fig. 1). Current passing through conductor 92 also energizes air control solenoid 37 to admit air from air pump or air pressure source 25 into the air pressure control box 27, after which current returns to battery 74 through ground 93. Air pump or air pressure source 25 now delivers air through air valve 38, down through pipes 26 and 28, pressure regulator 34, conduits 30 and 31, check valves 32 and 33 to pressurize the fuel and oxidizer liquids in the tank 9 and 10. The air pressure "build up" is controlled by the pressure regulator 34, under the control of the pressure built up in fuel tank 9. During this initial pressure "build up" the fuel and oxidizer pressures will be delivered through conduits 136 and 137, pressure being delivered to upper left chamber 120b (Fig 3), through conduit 136, and also delivered to the right hand lower chamber 164 through connecting conduit 181, and fuel is also delivered through separate conduit 11 to intake side of fuel pump 7. Fuel is also delivered through the pump 7 to ignition fuel valve 13 through fuel supply conduit 4. In a similar manner the oxidizer pressure will be delivered from the now pressurized oxidizer tank 10 through conduits 137 and 182 (Fig. 1) to the lower enlarged balancing chamber 165 (Fig. 3) and to the upper chamber 121b below the cylinder 121. Oxidizer liquid will also be delivered through conduit 12 (Fig. 1) to the oxidizer pump element 8, and through supply conduit 5 to the oxidizer control ignition valve 14.

The spring 178 (Fig. 3) in the chamber 176 holds the control plate in "up" position, away from the stop member 179. Springs 169 and 170, resting on the plate 171, hold the main fuel and oxidizer balanced valves 112 and 113 closed. Spring 178a also resting on the plate 171 holds the central common valve actuating stem 125a elevated with the contacts 79, 80 and 81, 82 closed. The pistons 123, 124 and 125 are in the upper ends of their respective operating cylinders 120, 121 and 122 with the upper ends of the piston rods resting against the tops as the pressure chambers 120a, 121a and 122a.

When the relay 86 (Fig. 1) is closed to actuate the switch contact 88 current is also fed to the contact 91 of the firing switch 73 (now open). When the firing switch 73 is closed the "Fire" circuit, including conductor 94, overspeed switch 95 (now closed), conductor 96, ignition valve control solenoid 15, opens the ignition valves 13 and 14 to admit fuel and oxidizer components into the ignition chamber 2. From the solenoid coil 16 the now closed fire circuit passes through the (now closed) pressure control switch 99, intensifier device 111 to the electric ignitor device or spark plug 3 which is grounded on the frame of the ignition chamber 2 and through ground 107, the circuit returns to the battery 74, the fire circuit also including the conductor 71 which enters the air pressure control box 27. Within the box 72 (Fig. 2) the circuit extends through conductor 71 and energizes the solenoid coil 65 drawing the lower end of the floating lever 54 to the right against the tension of the spring 66 moving the pilot valve 49 to the left.

The opening of pilot valve 49 shifts the main valve actuator or piston 45 to the right a slight amount which opens the air control valve 41 a slight amount, admitting a small amount of differential pressure to the turbine inlet line 26 (Fig. 1). Air entering the branch line 62 to the bellows 59, and the tension of the spring 68, adjust the position of the floating pivot 55 along the bellows axis in proportion to the air inlet pressure to the air driven turbine 6.

At the desired predetermined value of the turbine inlet pressure, the pilot valve 49 covers the inlet ports to the two ends of the piston 45. The position of the piston 45 determines the position of the butterfly type throttle control valve 41, thus, when pressure increases in the diaphragm or bellows 59, the bellows moves the floating pivot 55 to the right, porting the right hand end of the power cylinder 46 to the air pressure in line 35 to move the valve 41 toward closed position until a "balance" has occurred with the pilot valve 49 moved into zero or closed position.

The turbine 6 (Fig. 1), now operating, drives the pumps 7 and 8, forcing fuel and oxidizer from tanks 9 and 10 into the ignition chamber 2 where the mixture is fired by the ignitor plug 3, and pressure is being built up in this ignitor chamber 2 due to the combustion. This ignitor chamber pressure is delivered through the conduit 103 and branch 104 to the bellows 102, which does not expand to open the pressure switch or break the circuit to the ignition control valves 13 and 14 until this pressure has exceeded a predetermined value.

Ignitor chamber pressure in the line 103 enters the central upper chamber 122a (Fig. 3), forcing the piston 125 and rod 125a downwardly. The arms 128 and contacts 80 and 83, are carried downwardly with the piston rod 125a and the downwardly projecting ends 128a of the arms 128 strike the two main valve rod heads 159a and 160a on the main fuel and oxidizer valve rods 159 and 160, depressing the rods to open the main fuel and oxidizer valves 112 and 113. The fuel and oxidizer components now flow through the supply conduits 152 and 153 from the turbine driven pumps 7 and 8 and conduits 152 and 153 (Fig. 1) past the main valves 112 and 113, through the delivery conduits 149, 138 and 151, 139 (Figs. 1 and 3) to the fuel and oxidizer nozzles (not shown) in the thrust chamber 1 and are ignited therein by the burning or combustion of the fuel and oxidizer components, entering the thrust chamber 1 from the ignitor chamber 2.

The combustion in the main thrust chamber 1 further raises the "back pressure" in the conduits 103 and 104 to a point where the expanding bellows 102 opens the pressure switch 99, breaking the circuit to the plug 3, and to the ignition valve control solenoid 15, deenergizing the coil 16, permitting the return spring 18 to close the ignition control valves 13 and 14. The operation of the ignitor chamber is now discontinued although pressure is still present in the conduit 103, through the ignitor chamber 2.

Fuel tank pressure through conduit 136 enters upper left bellows chamber 120b (Fig. 3) tending to collapse bellows 123b and force the piston rod 123a downwardly to separate the contacts 82 and 83. This fuel tank pressure is balanced by oxidizer tank pressure entering the lower left bellows chamber 165 tending to collapse the bellows 167 and close the oxidizer main valve 113.

In a similar manner oxidizer tank pressure through conduit 137 (Fig. 1) enters upper right bellows chamber 121b (Fig. 3) tending to collapse bellows 124b and force the rod 124a downwardly to break the contacts 79 and 80 in the firing circuit. This downward bellows pressure is resisted by fuel tank pressure (Fig. 1) admitted through the conduit 181 into the lower right bellows chamber 164 tending to raise the fuel valve rod 159 and close the main fuel valve 112.

The solenoid 115 for lowering the elongated control plate 171 to the starting or running position is also in the fire circuit, and therefore, so long as the fire circuit is closed the plate 171 is maintained depressed against the control stop 179 relieving some of the closing tension on the valve springs 169 and 170, and on the central piston rod elevator spring 178a.

Thrust chamber pressure (Fig. 1) enters through conduit 103 into the upper central chamber 122a (Fig. 3) and operates against the piston 125, chamber 122b being isolated from chamber 126 by the bellows 125b and vented to atmosphere to eliminate leakage past piston 125, holds the actuator rod 125a and actuator arms 128 depressed, the arm extremities 128a and 128b thus holding the main fuel oxidizer valves open and fuel and oxidizer components enter through the conduits 149 and 151 (Fig. 1) into the thrust chamber 1.

*Safety shut down features*

If the air turbine pump 6 (Fig. 1) should speed up beyond a predetermined rate for any reason the overspeed governor 95, driven by the turbine 6, will lift rod 109 to open the overspeed switch 110, breaking the firing circuit to cause a "shut down."

If either of the fuel or oxidizer pump pressures between the main control valves and the injector for the thrust chamber exceed a predetermined amount, one or the other of the main fuel or oxidizer valve actuator upper rods 124a or 123a (Fig. 3) or both of the rods 123a and 124a will be moved downwardly relative to the intermediate piston rod 125a that is actuated by thrust chamber pressure through conduit 103, to cause a separation of one, or both sets of the contacts 82, 83 and 79, 80, de-energizes the relay 88 (Fig. 1), de-energizing the arm and fire control circuits to shut down the engine.

A purge or drain would be required in the particular arrangement before the operation could be repeated. The opening of the contacts 79, 80 or 81 and 82 is prevented if the thrust chamber pressure increases concurrently with both the fuel and oxidizer thrust chamber injector pressures. These contacts should be "set" to insure that excessive amounts of propellants are not permitted to flow through the main injector unless ignition occurs.

Leakage past the control pistons 123, 125 and 124 enters the upper bellows chambers 120b, 122b and 121b respectively, fuel leakage from chamber 120b being vented back to the fuel tank 9 through conduit 136. Oxidizer leakage from the oxidizer pressure chamber 121a, past piston 124, into upper right bellows chamber 121b is vented back to oxidizer tank 10 through the conduit 137 and chamber 122b is vented to atmosphere.

Leakage past the seals (rings on) pistons 161 and 162 of fuel and oxidizer main valves 112 and 113 enters the lower bellows chambers 164 and 165 and is vented back to the fuel and oxidizer tanks 9 and 10 through the conduits 181 and 182, the pressure on the sealing bellows 166 and 167 in these chambers being balanced because of the regulated tank pressure controlled by the regulator 34. It should be noted that the pressure forces are independent of altitude, when the oxidizer tank pressure equals the fuel tank pressure.

Maximum fuel and oxidizer flow is controlled by the position of the balancing control plate 171 (Fig. 3), upon which the springs 169 and 170 rest. During the increased pressure from preliminary ignition thrust to full thrust the mixture ratio is regulated because the oxidizer flow is controlled by the fuel pressure and the fuel flow is controlled by the oxidizer pressure.

Vent lines for the bellows chambers, pressure relief valves on pump discharges, purging and dumping provisions etc. are to be utilized, but these connections form no part of the invention and are neither disclosed or claimed.

Details of electrical circuits, such as power relays, latch-out mechanisms, etc., are not shown. These details form no part of this invention and are neither disclosed nor claimed.

"Shutdown" is normally a function of the turning of the firing switch to "off" position at anytime.

As before-mentioned the overspeed switch 110 will also cause a "shutdown" if it is opened by excessive turbine speed.

If the control is to be used with a variable thrust engine the control or balancing plate 171 (Fig. 3) is made adjustable to different full control positions by the changes in elevation of the stop member 179, together with means connected to operators control to establish the position of the lower pivot 56 of the floating lever 54 and to adjust the elevation of the stop 179.

What I claim is:

1. In a control system for non-hypergolic liquid propellant rocket engines; a main thrust chamber; an ignitor chamber in communication with the thrust chamber; a fuel tank; an oxidizer tank; means for supplying air under pressure; air driven turbine means having an air inlet; separate fuel and oxidizer propellant delivery pumps driven by the turbine means, having respectively fuel and oxidizer propellant inlets and outlets; fuel, oxidizer and air delivery conduit means connected respectively between the fuel tank, the oxidizer tank, the air supply means, and the fuel pump inlet, oxidizer pump inlet, and the air turbine means inlet; fuel and oxidizer propellant control valve means respectively in the fuel and oxidizer delivery conduit means; solenoid controlled actuator means for opening said propellant control valve means; means normally closing the propellant control valve means; normally closed solenoid operated air delivery control valve means in the air delivery conduit means; air delivery branch line means connected between the air delivery conduit means and the fuel and oxidizer tanks, intermediate these tanks and the air delivery control valve means for pressurizing the propellant tanks; inlet check valve means in said branch line means; pressure controlled pressure regulator means in said branch line means for controlling the maximum air pressure in the tanks, including pressure operated control means for the regulator; a pressure supply conduit connected between the fuel tanks and the pressure operated regulator control means for controlling the air delivery to the tanks in a predetermined ratio to the pressure in the fuel tank; fuel and oxidizer propellant delivery conduits connected between the fuel and oxidizer pump outlets respectively and the ignitor chamber; ignition valve means in the last mentioned fuel and oxidizer delivery conduits; solenoid actuator means for opening said ignition valve means to admit fuel and oxidizer propellants, delivered by the fuel and oxidizer pump means, into the ignitor chamber; means normally closing the ignition valve means; propellant ignitor means in the ignition chamber for igniting the propellants when introduced into the ignition chamber; main fuel and oxidizer delivery conduit means in communication respectively with the fuel and oxidizer pump means delivery outlets and with the interior of the thrust chamber; normally closed independently movable balanced main fuel and oxidizer control valve means respectively in said main fuel and oxidizer delivery conduit means; resilient means normally tensioning said main control valve means to closed position; solenoid operated means for reducing said main valve closing tension; pressure operated common valve actuator means for simultaneously moving said main fuel and oxidizer control valve means toward open position; pressure supply conduit means connected between the pressure operated common valve actuator means and the ignition chamber for delivering ignition chamber pressure and thrust chamber pressure to the pressure operated common valve actuator means to open said main fuel and oxidizer valve means; separate pressure operated main valve actuator means for moving said main fuel and oxidizer valve means toward full open position independently of the aforesaid pressure operated common valve actuator means, and independently of each other; a pressure delivery conduit connected between the main fuel delivery conduit to the thrust chamber and the separate pressure operated actuator for the main oxidizer control valve means; a pressure delivery conduit connected between the main oxidizer delivery conduit and the separate pressure operated actuator for the main fuel delivery valve means; an arming circuit including the solenoid operated air valve and the solenoid operated propellant control valve means; switch means for closing the arming circuit to admit air to the turbine and admit fuel and oxidizer propellants to the fuel and oxidizer pump inlets; and a firing circuit including the ignition valve solenoid actuating means, the ignitor means and the solenoid operated means for relieving tension on the main fuel and oxidizer control valve means.

2. Apparatus as claimed in claim 1, including separable electrical contact means in said arming circuit, carried respectively, by the separate pressure operated actuator for the main fuel delivery valve means, and by the separate pressure operated actuator for the main oxidizer delivery valve means, and by the separate pressure operated common main valve actuator means, and disposed in normal contacting relation and separable by relative movement therebetween to break the arming circuit incident to valve opening movement by either, or both, of the separate main fuel and oxidizer valve pressure operated actuators independently of the movement of the pressure operated common valve actuator means tending to simultaneously open the main fuel and oxidizer valve means.

3. Apparatus as claimed in claim 2 including normally closed overspeed switch means connected in the firing circuit and controlled by turbine speed to open the firing circuit when a predetermined turbine speed is exceeded.

4. Apparatus as claimed in claim 3 including pressure operated switch means connected in the energizing circuit to the solenoid actuator means for the ignition valve means, and a pressure supply conduit therefor connected to the ignition chamber pressure supply conduit means between the ignition chamber and the pressure operated common valve actuator means, for deenergizing the ignition valve opening solenoid means when a predetermined thrust and ignition chamber is exceeded.

5. In a control system for liquid fuel non-hypergolic rocket engines, having a main thrust chamber, an ignition chamber in communication with the thrust chamber, and an electrical ignitor device in the ignition chamber; means for supplying air under pressure; fuel and oxidizer propellant supply tanks; air supply conduit means connected between the pressurized air supply means and the tanks for pressurizing the tanks; a pressure regulator in said air supply conduit means having a pressure supply conduit connected to the fuel tanks, for regulating the maximum pressure in both tanks in predetermined ratio to fuel tank pressure; an air driven turbine having an air inlet; fuel and oxidizer pumps driven by the air driven turbine, each pump having an inlet and an outlet; an overspeed control switch device, driven by the turbine having normally closed contacts opened by overspeed of the air driven turbine; fuel and oxidizer supply conduits connected between the fuel and oxidizer tanks, respectively, and the fuel and oxidizer pump inlets; propellant control valves in the last named conduits; common actuator means normally closing the ignition control valves; solenoid actuated means connected to the propellant control valves to open them simultaneously to admit fuel and oxidizer to the fuel and oxidizer pump inlets; fuel and oxidizer delivery conduits connected to the ignition and thrust chambers of the engine; fuel and oxidizer ignition control valve means in the delivery conduits to the ignition chamber; balanced main fuel and oxidizer control valve means in the fuel and oxidizer conduits to the main thrust chamber; means normally closing the main fuel and oxidizer valve means; independent pressure operated means for independently opening the fuel and oxidizer main control valve means; common pressure operated means for simultaneously moving the fuel and oxidizer main control valve means to open position independently of the independent pressure operated means; a pressure supply conduit connected to each of said independent pressure operated means and to the fuel and oxidizer supply conduits between the fuel and oxidizer pump outlets and the thrust chamber; and a pressure supply conduit connecting the common pressure operated means to the ignition chamber.

6. In a liquid fuel rocket engine having a thrust chamber, and an ignitor chamber in communication therewith; fuel and oxidizer supply tanks; an air pressure source; and air pressure control device connected to the air pressure source including a normally closed air valve in said connection; solenoid actuator means for opening the air valve; an air driven turbine having an air inlet; an air delivery conduit connected between the air valve and the air turbine inlet and extending through the air pressure control device; air control throttle valve means in said air pressure control device, in the air supply conduit between the air valve and the turbine inlet for regulating air pressure delivered to the turbine to drive the same and having an air inlet; air operated throttle adjusting means including a pilot valve for controlling position of the throttle valve; an air supply pipe connected to the throttle valve air inlet and to the air supply conduit, including an air pressure regulator in the air supply conduit for regulating throttle valve moving air pressure; a floating lever connected at one end to the pilot valve to shift the same; pressure operated bellows means connected to the floating lever intermediate its ends to form a floating intermediate fulcrum for the lever; an air pressure supply line for the bellows means connected to the air supply conduit intermediate the throttle valve air inlet and the air turbine inlet; solenoid actuated means connected to the floating lever at its other end, forming a second floating fulcrum for the lever for moving the second floating lever fulcrum about the first floating lever fulcrum to shift the pilot valve to admit air to the air operated throttle adjusting means to open the throttle valve to admit air to the turbine and to the bellows means; spring means connected to the floating lever and tensioned to open the throttle valve a predetermined degree; fuel and oxidizer pumps driven by the air turbine; fuel and oxidizer supply conduits connected between the fuel and oxidizer tanks and the fuel and oxidizer pumps; fuel and oxidizer propellant valve means in the fuel and oxidizer supply conduits; propellant valve actuator means connected to the valves to cause simultaneous movement of the valves between open and closed positions; means for tensioning the propellant valve means toward closed position; solenoid valve opening means connected to the propellant valve actuator means for simultaneously opening the propellant valves; fuel and oxidizer delivery conduits connected respectively between the fuel and oxidizer pumps and the ignitor chamber; ignition valve means in the last named supply conduits, means normally closing the ignition valve means; solenoid operated means connected to the ignition valve means for simultaneously opening the ignition valve means to admit fuel and oxidizer propellant liquids into the ignitor chamber; main fuel and oxidizer delivery conduits connected respectively in communication with the fuel and oxidizer pump outlets and in communication with the interior of the thrust chamber; main fuel and oxidizer balanced control valves in said main fuel and oxidizer delivery conduits; oxidizer tank pressure operated means for moving the oxidizer main valve to closed position; a communicating conduit connected between the oxidizer pressure operated means and the oxidizer tank, fuel tank pressure operated means for moving the fuel valve means to closed position; a communicating conduit connected between the fuel pressure operated means and the fuel tank for moving the main fuel valve to closed position; main oxidizer valve opening means; fuel pump pressure actuated means for moving the main oxidizer valve toward open position; a fuel supply conduit connected between the fuel pump pressure actuated means and the fuel delivery conduit to the thrust chamber; oxidizer pump pressure actuated means for moving the main fuel valve toward open position; an oxidizer delivery conduit connected between the oxidizer pump, oxidizer pressure actuated means and the oxidizer delivery conduit to the thrust chamber; common main fuel and oxidizer valve actuator means movable to simultaneously open the main fuel and oxidizer valves; ignition chamber pressure operated actuator means for moving the common main fuel and oxidizer valve actuator means to simultaneously open the same; an ignition pressure supply conduit connected between the ignition pressure operated actuator means and the ignition chamber; spring means normally tensioning said common actuator means toward inoperative position including a movable spring seat; solenoid actuator means for moving the spring seat to decrease the last mentioned spring tension; an electric ignitor device in the ignitor chamber for firing the fuel and oxidizer propellants when introduced into the ignitor chamber, an arming circuit; cooperating separable normally closed contacts in said arming circuit carried respectively by said common main fuel and oxidizer valve actuator means, and the fuel pressure operated main fuel valve moving means, and the oxidizer pressure operated main oxidizer valve moving means, said arming circuit including the first mentioned solenoid actuator means, the said solenoid valve opening means for the fuel and oxidizer propellant valve means; and a cooperating firing circuit including the solenoid actuated means connected to the floating lever, the solenoid operated means for opening the ignition valve means, the electric ignitor device in the ignitor chamber, and the solenoid actuator means for moving the spring seat to decrease the spring closing tension on the main fuel and oxidizer valve means.

7. Apparatus as claimed in claim 6 including a pressure operated switch device connected to the ignition chamber pressure supply conduit to be operated by ignition chamber pressure therein to deenergize the ignition valve opening solenoid actuator and interrupt the circuit to the electric ignitor device, incident to predetermined ignition chamber pressure.

8. Apparatus as claimed in claim 7 including a normally closed overspeed control switch device in the firing circuit and driven by the air turbine to interrupt the firing circuit upon overspeed of the turbine.

9. Apparatus as claimed in claim 8 including a holding circuit closing relay device connected in the arming circuit to be energized thereby to complete the arming circuit.

10. In a non-hypergolic liquid propellant rocket engine; a thrust chamber; pressurized fuel and oxidizer propellant supply means connected to the thrust chamber to supply fuel and oxidizer thereto; balanced fuel and oxidizer control valve means in each of the pressurized fuel and oxidizer supply means to individually control the delivery of fuel and oxidizer to the thrust chamber; thrust chamber pressured operated control means for said valve means connected to the thrust chamber for actuation thereof by thrust chamber pressures for simultaneously actuating each of the fuel and oxidizer control valve means to simultaneously admit fuel and oxidizer into the thrust chamber at a rate proportional to thrust chamber pressure; said fuel and oxidizer propellant supply means including turbine power means and fuel and oxidizer propellant pump means connected to said turbine power means to be driven thereby for simultaneously supplying fuel and oxidizer respectively to each of said balanced fuel and oxidizer control valve means under pump pressure; separate fuel and oxidizer pressure responsive control means connected to receive respectively oxidizer and fuel delivery pressures for separately controlling the opening said fuel and oxidizer control valve means proportionally to predetermined oxidizer and fuel delivery pressures.

References Cited in the file of this patent

UNITED STATES PATENTS

| | | |
|---|---|---|
| 1,052,588 | Janicki | Feb. 11, 1913 |
| 2,470,564 | Lawrence et al. | May 17, 1949 |
| 2,575,677 | Neu | Nov. 20, 1951 |
| 2,631,426 | Jewett | Mar. 17, 1953 |

FOREIGN PATENTS

| | | |
|---|---|---|
| 452,900 | Germany | Nov. 22, 1927 |